(12) United States Patent
Crow et al.

(10) Patent No.: US 8,263,155 B2
(45) Date of Patent: Sep. 11, 2012

(54) BEVERAGE DISPENSER OUTLET AND A METHOD OF PREPARING A BEVERAGE WITH SAME

(75) Inventors: Darren William Crow, Westerville, OH (US); Takeshi Masu, Hyougo (JP); Jurgen Leenders, Pannerden (NL); Richard Patrick Egnor, Huntsville, OH (US); Travis D. Hall, Marysville, OH (US); J. Antonio Gutierrez, Dublin, OH (US); Amol Bhalerao, Dublin, OH (US)

(73) Assignee: Nestec S.A., Vevey (CH)

( * ) Notice: Subject to any disclaimer, the term of this patent is extended or adjusted under 35 U.S.C. 154(b) by 556 days.

(21) Appl. No.: 12/466,063

(22) Filed: May 14, 2009

(65) Prior Publication Data

US 2009/0285955 A1    Nov. 19, 2009

Related U.S. Application Data

(60) Provisional application No. 61/053,641, filed on May 15, 2008.

(51) Int. Cl.
*B67D 7/78* (2010.01)

(52) U.S. Cl. ....... 426/474; 222/190; 222/1; 222/189.08; 222/566

(58) Field of Classification Search .................. 426/474; 222/190, 189.08, 566, 1
See application file for complete search history.

(56) References Cited

U.S. PATENT DOCUMENTS

| | | | | |
|---|---|---|---|---|
| 2,633,343 A | * | 3/1953 | Aghnides | 239/428.5 |
| 2,829,874 A | * | 4/1958 | Freeman | 239/433 |
| 3,209,554 A | * | 10/1965 | MacManus | 62/306 |
| 3,230,906 A | * | 1/1966 | MacManus | 426/302 |
| 3,618,856 A | * | 11/1971 | Sachnik | 239/8 |
| 4,830,869 A | * | 5/1989 | Wimmers et al. | 426/595 |
| 5,151,199 A | | 9/1992 | Poulin et al. | 210/773 |
| 5,364,031 A | * | 11/1994 | Taniguchi et al. | 239/330 |
| 5,611,490 A | * | 3/1997 | Barriac et al. | 239/333 |
| 5,927,553 A | | 7/1999 | Ford | 222/129.4 |
| 6,769,352 B2 | | 8/2004 | de Bruin et al. | 99/323.1 |
| 6,799,504 B2 | | 10/2004 | Brouwer | 99/323.1 |
| 7,059,498 B2 | | 6/2006 | Ufheil et al. | 222/190 |
| 2005/0079265 A1 | | 4/2005 | Ufheil et al. | 426/569 |
| 2006/0175351 A1 | | 8/2006 | Reddy et al. | 222/145.5 |
| 2007/0012193 A1 | | 1/2007 | Oehninger | 99/279 |

(Continued)

FOREIGN PATENT DOCUMENTS

DE    38 38 683 A1    5/1990

(Continued)

OTHER PUBLICATIONS

International Search Report, application No. PCT/EP2009/054706, mailed Jul. 17, 2009.

(Continued)

*Primary Examiner* — Anthony Weier
(74) *Attorney, Agent, or Firm* — Winston & Strawn LLP

(57) ABSTRACT

A beverage dispenser, including a whipper disk and a dispensing spout connected downstream to the housing for dispensing the whipped beverage mixture. A sieve is disposed within the dispensing spout and is configured for reducing the number of large bubbles present within the fluid over a predetermined size. An output plate covers a downstream end of the dispensing spout and has a plurality of holes formed therein for reducing the velocity of the whipped beverage mixture through the dispensing spout.

17 Claims, 10 Drawing Sheets

U.S. PATENT DOCUMENTS

| | | | |
|---|---|---|---|
| 2007/0259092 A1 | 11/2007 | Chen et al. | 426/569 |
| 2008/0233264 A1 | 9/2008 | Doglioni Majer | 426/594 |
| 2008/0260927 A1* | 10/2008 | Steenhof et al. | 426/569 |

FOREIGN PATENT DOCUMENTS

| | | |
|---|---|---|
| EP | 1 250 875 A1 | 10/2002 |
| EP | 1 688 073 A1 | 8/2006 |
| WO | WO 2007/045949 A1 | 4/2007 |
| WO | WO 2009/063049 A2 | 5/2009 |

OTHER PUBLICATIONS

International Search Report, application No. PCT/EP2008/065553, mailed Jun. 5, 2009.

* cited by examiner

BEVERAGE DISPENSER OUTLET AND A METHOD OF PREPARING A BEVERAGE WITH SAME

CROSS-REFERENCE TO RELATED APPLICATIONS

This application claims the benefit of provisional application No. 61/053,641 filed May 15, 2008, the entire content of which is expressly incorporated herein by reference thereto.

FIELD OF THE INVENTION

The present invention relates to a mixing device that provides a frothy fluid product. More particularly, the invention relates to a mixing device for mixing, frothing, and dispensing a beverage.

BACKGROUND OF THE INVENTION

Espresso drinks, in comparison to other coffee drinks, are noted for a fine layer of bubbles ("crema") that settles on the top of the drink from fine bubbles that are interspersed within the drink during the brewing process. Coffee consumers in many markets view a crema as a key indicator of a good cup of espresso. Espresso and other coffee and milk drinks are sometimes prepared by mixing a powder or fluid concentrate in water. However, the quality perception of theses drinks is sometimes an issue if the crema does not resemble that when the espresso is prepared from ground coffee.

Mixing devices are known for speedier preparation of coffee, espresso, and other such beverages and other foods by mixing a powdered or liquid concentrate food component with a liquid, such as water. These devices typically feed the powdered or concentrate component into the water, which is often pumped tangentially into a mixing chamber to create a whirlpool to mix the powder or concentrate into the water. When these products are reconstituted in a dispenser, the process does not follow the same steps as a roast and ground espresso product so a fine layer crema is not generated. Instead, a layer of undesirable large bubbles ("foam") may be generated, the magnitude dependent on the particular recipe of the powder or concentrate and the flow path for dispensing. To the consumer these bubbles could indicate that the coffee was not made correctly.

In known mixing devices, the mixture is then fed to a whipping mechanism, which is usually a rotating plate. The plate aerates the mixture and produces a froth. The frothed mixture is usually dispensed into a container for drinking. Such known whipping mechanisms, however, may only increase the amount of foam present in the coffee because the froth that they produce is aimed at producing bubbles that are much larger than those that distinguish crema.

U.S. Pat. No. 5,927,553, for example, discloses a mixing and dispensing apparatus with a cruciform frothing blade. Other shapes of frothing blades are also known. For instance, companies such as Rhea and Zanussi use whippers with an axially short disk with very steep sloped walls. U.S. Pat. No. 7,059,498, for example, discusses a mixing device including a conical whipping rotor that is configured to produce large bubbles within a beverage so as to form a layer of foam along the top of the beverage. Other whippers have disks with independent ramps extending from a substantially flat plate. The known devices generally have their greatest efficiency for preparing a small group of products.

Therefore, there is a need for a mixing device with an improved whipping mechanism that reduces or eliminates the production of large bubbles or foam in favor of finer bubbles. It may be further desired that in such devices, the elements that come into contact with coffee can be easily accessed to be cleaned.

Furthermore, crema generation is often benefited by slow flow speeds, whereas when filling a carafe with a large amount of "American style" coffee, speed is favored and crema production may not even be desirable. If dispensed into a multi-cup carafe for a server to pour from, the large bubbles can often prevent full filling of the carafe if they are overflowing from the top. For this solution, a system is needed that does not produce bubbles or crema and is able to rapidly fill a carafe.

Lastly, there is a need for a dispensing device that can be easily cleaned by the operator. Actually, when fine bubbles of crema are produced by the whipper, the complete evacuation of these fine bubbles from the dispenser outlet spout is sometimes difficult because the bubbles tend to stick to the inside walls of the spout.

SUMMARY OF THE INVENTION

The present invention relates to a beverage dispenser comprising a whipper configured for flowing a liquid beverage mixture therethrough and for whipping a beverage mixture to produce a high-quality crema; a dispensing spout connected downstream of the whipper for dispensing the whipped beverage mixture; a first filter element disposed within the dispensing spout configured for reducing the number of large bubbles present within the fluid over a predetermined size; and a second filter element covering a downstream end of the dispensing spout and having a plurality of holes formed therein for reducing the velocity of the whipped beverage mixture through the dispensing spout.

The first filter element in the dispensing spout of the beverage dispenser can be a sieve having a first plurality of holes formed therein, and the second filter element covering the downstream end of the dispensing spout can be an output plate having a second plurality of holes formed therein. The first plurality of holes formed in the first filter element are smaller in size than the second plurality of holes formed in the second filter element. The output plate and the sieve are spaced to form a void between the bottom surface of the sieve and the upper surface of the output plate, and the dispensing spout is configured to permit access to the space therebetween to a user. This space between the sieve and the output plate in the output conduit is also referred to as a void. In one embodiment, the sieve can be affixed within the dispensing spout of the dispenser, and the output plate of the dispenser can be moveable away from the downstream end of the dispensing spout to permit access to the space or void between the output plate and the sieve. In another embodiment of the invention, the output plate can be affixed to the dispensing spout of the dispenser by a hinge that permits the output plate to be selectively positioned to cover the downstream end of the dispensing spout, such that the output plate is moveable away from the downstream end of the dispensing spout. The output plate can include a clip configured to maintain the output plate in a position so as to cover the downstream end of the dispensing spout. The output plate can be removably affixed to the dispensing spout to permit the output plate to be selectively positioned to cover the downstream end of the dispensing spout but such that the output plate is moveable away from the downstream end of the dispensing spout to allow cleaning of the dispensing spout. In one embodiment, the output plate is removeably affixed to the dispensing spout with a press-fit association.

In another embodiment, the dispenser can further comprise a secondary inlet in fluid communication with the dispensing spout such that the liquid beverage mixture from the whipper will not flow through the secondary inlet during normal operating conditions, and wherein the sieve is removable from the dispensing spout through the secondary inlet. The sieve can have an extension affixed thereto having a proximal end that is positioned proximate to the secondary inlet and configured to permit a user to grasp the proximal end to aid in removing the sieve from the dispensing spout of the beverage dispenser. This extension affixed to the sieve may include a number of radially-extending flanges or wings to maintain a desired position of the sieve within the dispensing spout.

In another embodiment, the dispenser can further comprise a cover removeably affixed to the secondary inlet and configured to abut the proximal end of the extension to maintain a desired position of the sieve within the dispensing spout.

The beverage dispenser can also include a secondary inlet in fluid communication with the dispensing spout and configured for receiving a fluid from a fluid source that feeds both the mixing chamber and the secondary inlet. In this embodiment, the beverage mixture is preferably formed at a first concentration that is variable based on a volume of fluid provided into the mixing chamber, and the dispensing spout is configured to reduce the first concentration to a lower, second concentration by receiving the fluid from the fluid source through the secondary inlet while the beverage mixture passes therethrough.

Another embodiment of the invention relates to a method for preparing a beverage having a high-quality crema, which comprises introducing a beverage mixture into the whipper of the dispenser disclosed herein; whipping the beverage mixture; and dispensing a beverage having a high-quality crema from the dispenser.

BRIEF DESCRIPTION OF THE DRAWINGS

The above features and other advantages of the invention will become better understood by reference to the following detailed description of preferred embodiments and the accompanying drawings wherein.

DETAILED DESCRIPTION OF THE PREFERRED EMBODIMENTS

Figure 1:
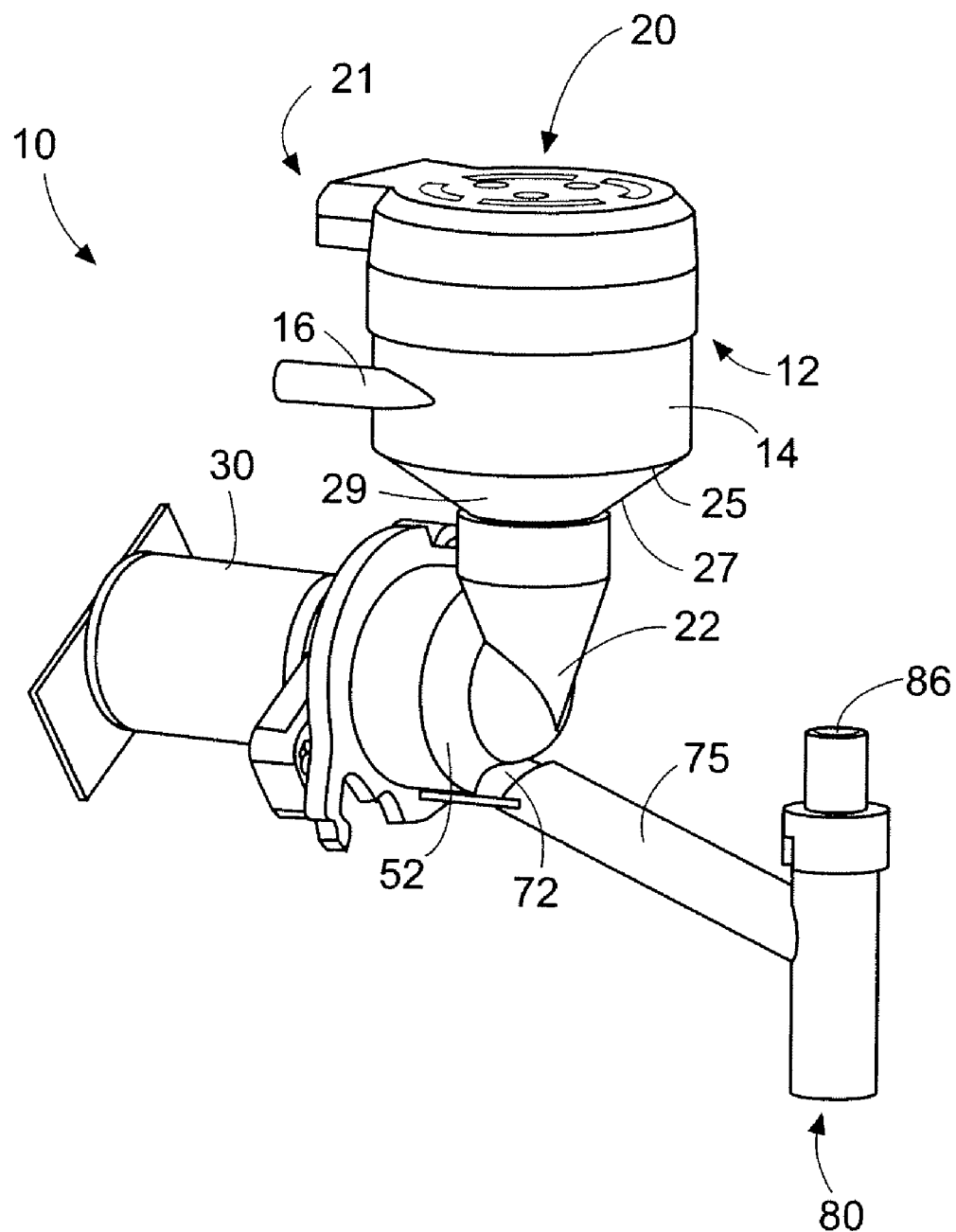
FIG. 1 is a perspective view of a whipping mechanism according to an embodiment of the present invention.
Figure 2:
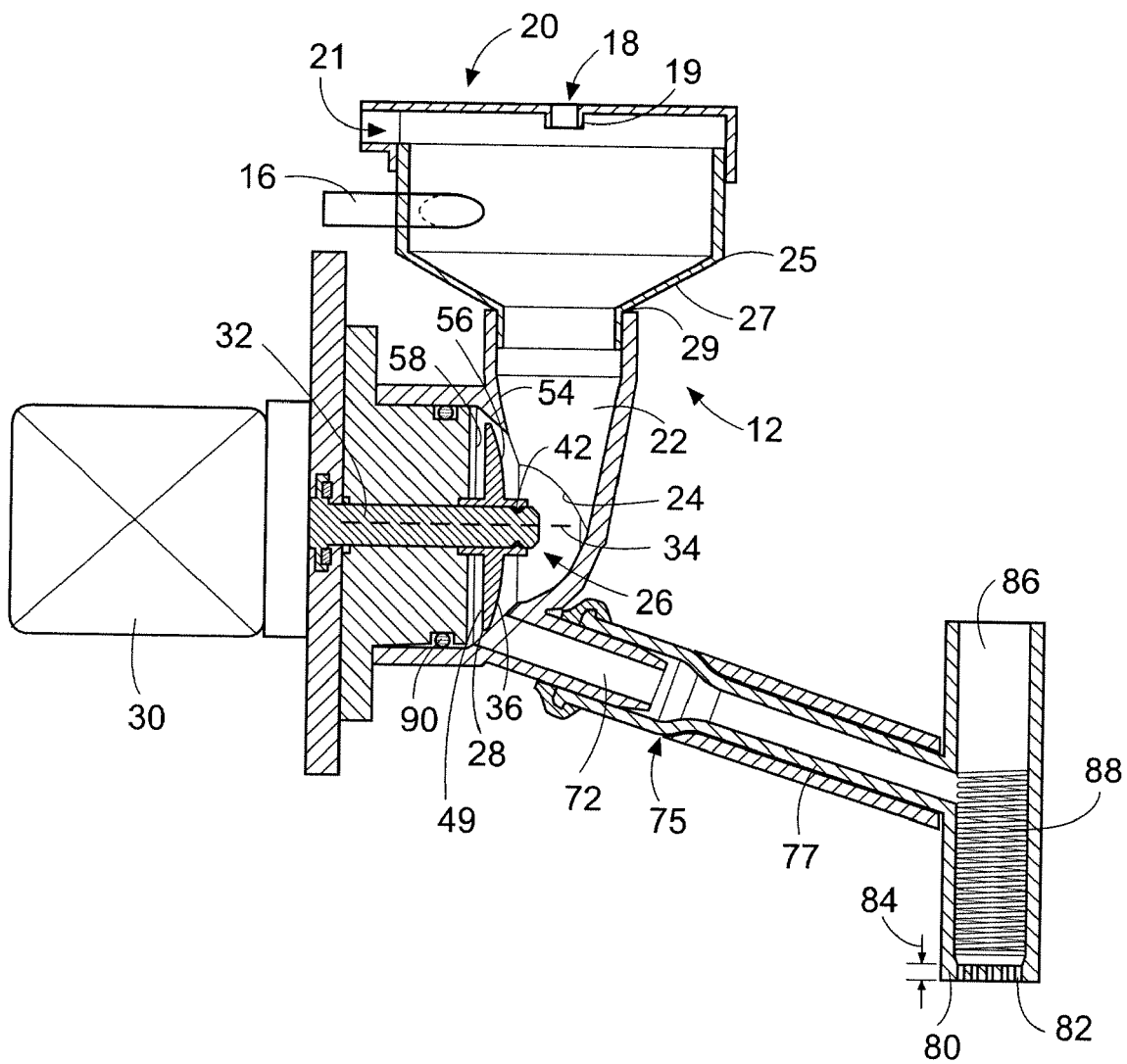
FIG. 2 is a side cross-sectional view thereof.
Figure 3:
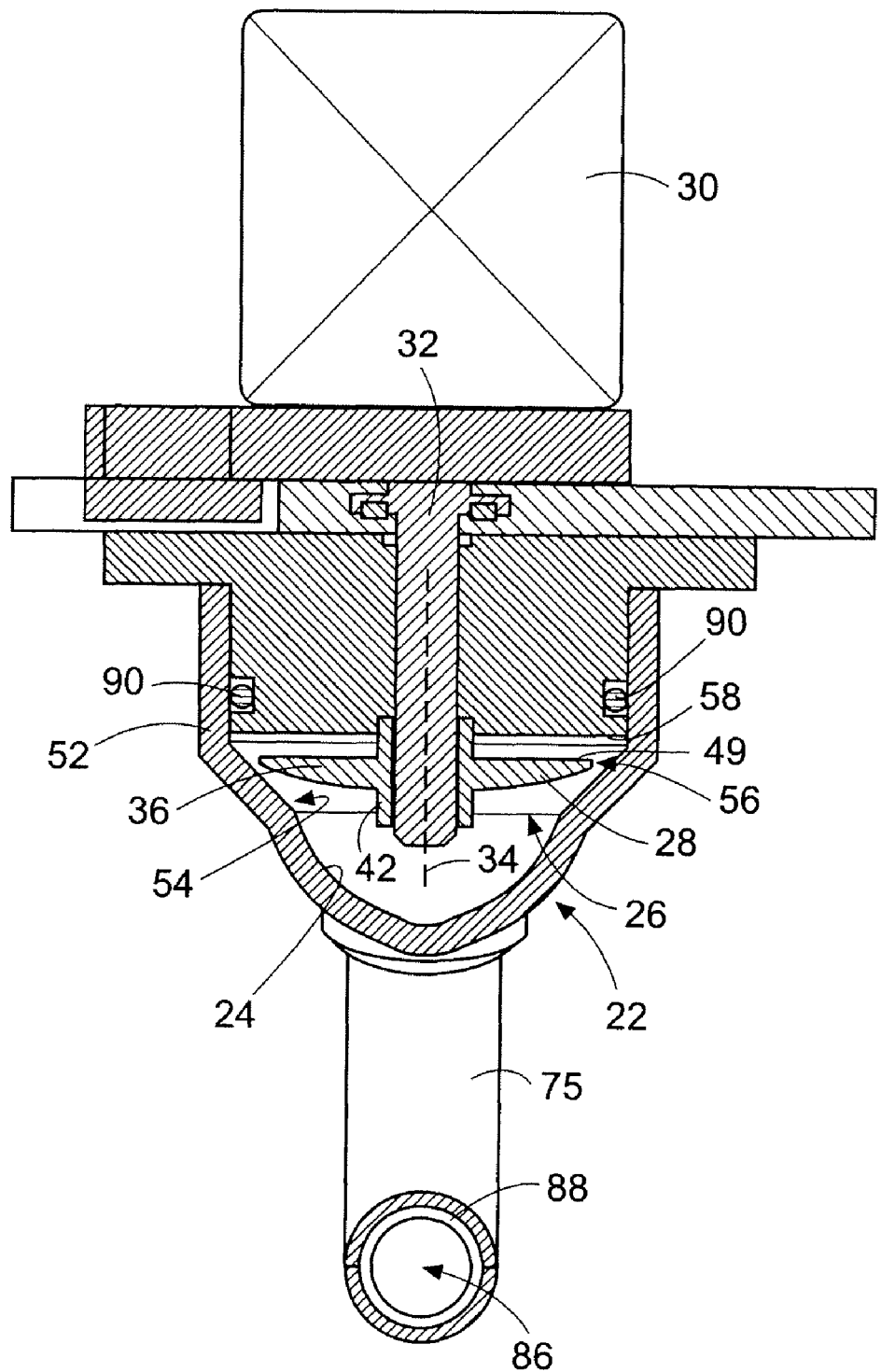
FIG. 3 is a top cross-sectional view thereof.

Referring to FIGS. 1-3, a preferred embodiment of the invention includes a mixing device 10 that has an input container 12. The input container 12 comprises a bowl portion 14 with a tangential inlet 16 for feeding a fluid under pressure. An automatically controlled valve is preferably provided to control the fluid flow into the input container 12. The fluid is introduced through the inlet at a speed selected to produce a swirling flow, preferably substantially a whirlpool effect.

A component to be mixed with the fluid, which may be a liquid concentrate or a powdered food substance, is fed into powder inlet 18 or into a plurality of inlets 18, which preferably includes an opening at the top of the bowl portion 14. Preferably, the component is in the form of a liquid concentrate. The concentrate or other substance can be fed by hand or automatically by a source, preferably disposed above the device 10. The source preferably has a dosing mechanism, such as a dosing screw, to automatically dose a predetermined amount of the food substance into the input container 12. A lip 20 extends around the interior of the inlet 18, protruding into the bowl portion 14 to prevent the swirling fluid from exiting the input container 12 by the upper side thereof. A suction is applied to orifice 21, connected to the underside of the lip 20 for extracting any splashed material. The inlet is sufficiently large to receive the substance poured therein and also to receive a sufficient amount of air for mixing with the fluid and component.

In the embodiment shown, a throat portion 22 of the input container 12 is disposed below the bowl portion 14. The throat portion 22 preferably has a narrower diameter than the bowl portion 14 and has a throat opening 24 disposed on a lateral side, as shown in FIG. 2. The throat portion 22 is preferably generally coaxial with the bowl portion 14 and narrows substantially evenly along the axis of the bowl portion 14. This improves the fluid flow therein and reduces any trapping of powder or other food substance. Preferably, a transition between the bowl portion 14 and the throat portion 22 has an inward bend 25, followed by a sloped portion 27, which is followed by an outward bend 29, in cross-section.

Referring to FIGS. 2 and 3, a whipper assembly 26 is in fluid communication with the input container, preferably at the throat opening. The whipper assembly includes a whipper disk 28. A motor 30 drives disk shaft 32, which drives the whipper disk 28 so that the motor 30 drives the whipper at about whipper axis 34. A motor controller is preferably provided to control the operation and speed of the motor 30.

The preferred whipper disk 28 has a convex, substantially dome-shaped whipper surface 36. The dome-shaped surface 36 preferably faces outwardly with respect to the whipper axis 34. The dome shape of whipper surface 36 can be configured such that whipper surface 36 is a revolved surface formed from a circular arc segment. In such a configuration, whipper surface 36 is in the form of a truncated sphere having a transverse radius 38 and a surface radius 48. Preferably, transverse radius is between 5 mm and 20 mm in length. In an embodiment, transverse radius is at least about 12 mm. Preferably, transverse radius is between 10 mm and 18 mm and more preferably about 16 mm. Surface radius 48 is larger than transverse radius, and is preferably between 3 times and 5 times larger than transverse radius. In a preferred embodiment, surface radius 48 is about 4 times larger than transverse radius. In an embodiment surface radius is at least about 20 mm. In one embodiment, surface radius 48 is preferably less than about 100 mm. In a preferred embodiment surface radius 48 is between about 30 mm and 80 mm and is more preferably about 65 mm. Alternatively, whipper surface 36 can be a surface of revolution formed by a portion of an ellipse or other oval shape. In such an embodiment the segment of the ellipse used to form the surface of revolution is symmetrical about the minor axis thereof. The whipper surface 36 preferably has a surface area of between about 150 $mm^2$ and 3000 $mm^2$. In a preferred embodiment, whipper surface 36 has a surface area of between about 500 $mm^2$ and 1500 $mm^2$, and more preferably between about 700 $mm^2$ and 900 $mm^2$.

A central tube 42 is formed substantially near the center of whipper disk 28 along whipper axis 34. Whipper surface 36 surrounds central tube 42 and is configured to have a surface area that is between 4.5 and 5 times the transverse area of central tube 42. More preferably the surface area of whipper surface 36 is about 4.8 times the transverse area of central tube. Preferably, a line 68 passing from the edge of whipper disk to the intersection of whipper surface 36 and central tube 42 forms an angle 69 relative to a plane defined by the edge of whipper disk. Angle 69 can vary with the diameter and height of whipper disk, and is preferably between about 0° and about 45°. Preferably, angle 69 is between 10° and 30°. More preferably angle 69 is about 15°. Preferably, whipper disk has a height 44 that is defined as the distance between a plane formed by the outside edge of disk back surface 49 and a plane defined by the intersection of whipper surface 36 and central tube 42. Preferably, height 44 is at least about 1 mm and at most about 15 mm, more preferably is at least about 2 mm and at most about 8 mm, although other heights can be used. In an embodiment, height 44 is between 4 mm and 8 mm, and more preferably about 5 mm.

Whipper disk 28 includes a plurality of concave portions 60 formed thereon. That separate whipper surface 36 into segments 39. Concave portions 60 preferably extend from the center of whipper disk 28 radially outward to near the edge of whipper disk 28. In the embodiment shown, concave portions 60 have a uniform shape with respect to whipper surface 36, and the depth is not uniform, decreasing in a radial, outward direction. In an alternative embodiment, the shape and depth can be varied or uniform. In a preferred embodiment, the width 66 and depth 67 that is measured at the innermost portion thereof, as shown in FIG. 3. In an embodiment, width 44 is between about 1 and 2 times larger than the depth. More preferably the width 44 is about 1.5 times larger than the depth. Preferably, each concave portion 60 extends along at least 50% of the radius of whipper disk 28. In the embodiment shown in FIG. 4, the innermost end of concave portion 60 is spaced apart from whipper axis 34 in a radial direction. Additionally, concave portion 60 terminates radially inward of the outside edge of whipper disk 28. In such an embodiment concave portion 60 can extend along at least about 75% of transverse radius 38. In other embodiments concave portion 60 can extend along at least 80% of transverse radius 38 and more preferably at least 90%. In an embodiment, concave portions 66 may be formed so as to extend substantially all the way to the outside edge of whipper disk 28.

Whipper disk 28 can include a number of concave portions 60, and preferably includes between 1 and 10 concave portions 60. In a preferred embodiment, whipper disk 28 includes between 2 and 6 concave portions, and more preferably includes 4 concave portions. The size, and particularly the width 66 of concave portions 60 varies with the number of concave portions 60 present in whipper disk 28 such that the aggregate surface area of whipper surface segments 39 is about three-times the aggregate surface are of the area occupied by concave portions 60, and more particularly about four times the aggregate surface area. Also, the preferred concave portions 60 are substantially equally spaced about the whipper surface 36.

Figure 4:
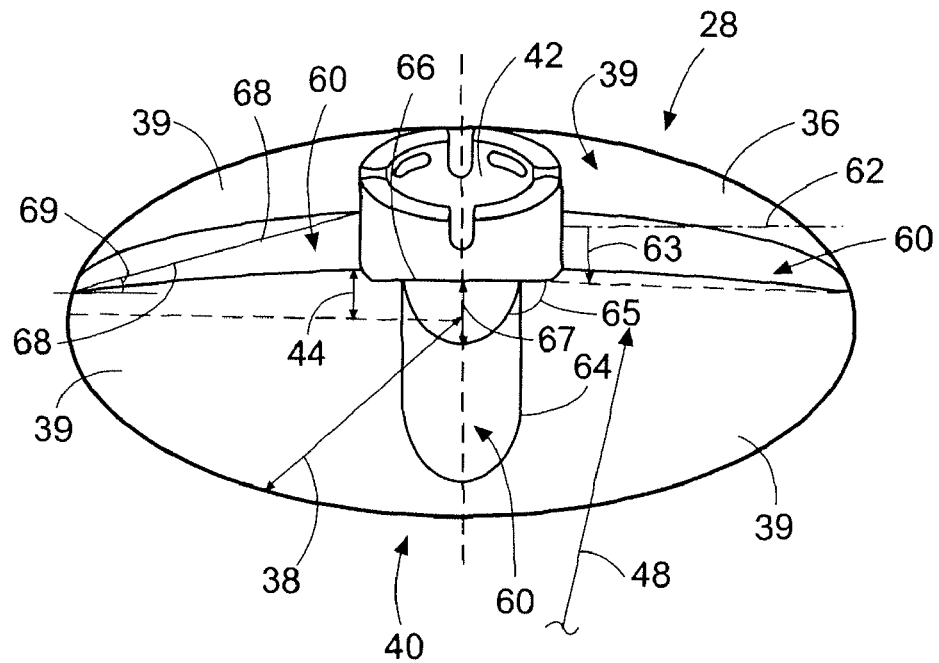
FIG. 4 is a perspective view of a whipper disk used therein.
Figure 5:
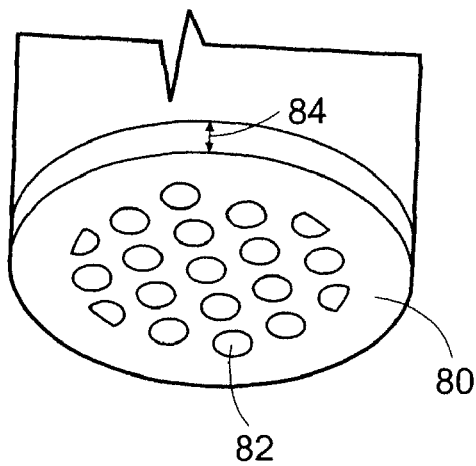
FIG. 5 is a perspective view of a plate that can be affixed on an output nozzle thereof.

In a preferred embodiment, concave portions 60 are semi-cylindrical in shape. In such an embodiment, concave portions 60 extend along an axis 62 and have a radius 63 such that the concave portion is defined by the intersection of the cylinder defined thereby and whipper disk 28. Accordingly, the size and shape of concave portion 60 will vary with the radius thereof, as well as the position and orientation of axis relative to whipper disk 28. In a preferred embodiment, axis 62 is normal to whipper axis 34. In such an embodiment, as with other possible embodiments, concave portions 60 will have a shape that tapers in the outward direction of radius 63. As shown in FIG. 4, the width at the top of concave portions 60 decreases with the distance from whipper axis 34. Alternatively, axis 62 can be downwardly declined relative to whipper axis 34. Preferably whipper disk 28 and is spaced apart from back wall 58 of the whipper housing at a distance substantially equal to the height 44 of whipper disk 28, although it can be slightly less in order to give the desired size properties for concave portion. Preferably, radius 63 is between about 1 mm and 10 mm. More preferably, radius 63 is between about 3 mm and 8 mm. In a preferred embodiment radius 63 is about 4 mm. In an embodiment, radius 63 is at least about 1 mm less than the height of whipper disk 28 at the apex of whipper surface 36. In an embodiment where concave portions 60 taper, the percentage of the overall circumference of whipper surface 36 that is occupied by the concave portions 60 in aggregate can vary with the radial distance from the whipper axis 34 at which the circumference is measured. In an embodiment, at the innermost end of concave portions 60, concave portions 60 can occupy at least about 50% of the total circumference, and more preferably about 75%. Further, at the outside edge of whipper disk 28, concave portions 60 can occupy between about 0% and 10% of the total circumference. In one embodiment concave portions 60 can occupy 0% of the total circumference at a distance of up to 5 mm from the outside edge of whipper disk 28. In an embodiment, concave portions 60 occupy about 50% of the total circumference at a radial distance that is between about 25% and 50% of the transverse radius 38. Further, concave portions can occupy less than 25% of the total circumference beginning at a radial distance that is at least about 50% of the transverse radius 38, and less than about 10% of the total circumference at a distance that is at least about 75% of the transverse radius 38.

The edge 64 formed between whipper surface 38 and concave portion 60 is preferably substantially sharp so as to create cavitations in the fluid exposed thereto. Preferably, an angle 65 is formed along edge 64 that may vary with the distance from whipper axis 34. Preferably, angle 65, when measured near the innermost portion of concave portion 60, is between about 30° and 90° and is more preferably about 90°. In a preferred embodiment, angle 65 preferably decreases as it extends toward the outer edge of whipper disk 28. Whipper discs with the desirable aspects create small bubbles using a localized vacuum effect as concave cross section of the disc passes through the mixture.

The preferred whipper disk 28 is optimized to efficiently produce a quantity of bubbles within fluid based on the flow of fluid substantially near whipper disk 28 at a sufficient flow rate. The formation of bubbles within the fluid is improved by the controlled cavitation within the fluid caused by movement of whipper disk 28 in a volume of fluid surrounding whipper disk 28. The structure of the preferred whipper disk 28 is configured, according to the embodiments disclosed herein, to produce not only a desired quantity of bubbles within the fluid, but also bubbles that are generally of a smaller size than other known whipping devices. Specifically, when whipper disk 28 is used with a coffee product, and in particular an espresso product formed within mixing chamber 12 as discussed above, the bubbles formed are of a small size sufficient to form a layer of crema when the bubbles settle along the top of the dispensed fluid. Although bubbles within crema and within foam may include some bubbles of a similar size, the bubbles are generally much smaller within crema than within foam. In general, the preferred whipper disk 28 is configured to increase the proportion of small bubbles to large bubbles within the dispensed fluid. Thus, a beverage having a high-quality crema can be prepared after introducing a beverage mixture into the whipper; and whipping the beverage mixture therein.

Whipper disk 28 preferably includes an attachment portion near whipper axis 34. Attachment portion is preferably in the form of a central tube 42 that is configured to engage the output shaft of motor 30. The engagement between tube 42 and the output shaft can be facilitated by a configuration that results in a press-fit therebetween. Preferably the parts are configured to maintain a friction fit therebetween such that whipper disk 28 rotates with the rotation of the motor output shaft 32. Alternatively, the tube 42 and the output shaft 32 can have mating profiles to facilitate the mutual rotation thereof. Whipper disk 28 is disposed within a whipper housing 52, which in the embodiment shown is integral part of unitary construction with the input container 12.

The preferred whipper housing 52 has an inner housing surface 54 with a shape that at least partially overlies whipper disk 28. A shear gap 56 is defined between the inner housing surface 54 and whipper surfaces 36 that can vary as whipper housing 52 extends over whipper disk 36. Measured at the most narrow point between whipper disk 28 and whipper housing 52, the shear gap 56 can be at least about 0.5 mm, more preferably at least about 0.8 mm, and most preferably at least 1 mm. Measures at this location, shear gap 56 is preferably at most about 2.5 mm and more preferably at most about 1.5 mm. In the preferred embodiment, however, the size and configuration of the shear gap is not required in the formation of sufficiently small bubbles within the fluid. Rather, the configuration of whipper disk 28, itself, influences bubble formation, the whipper housing 52 being shaped to provide both for flow of the fluid into contact with whipper disk 28 and retention of the fluid in contact with whipper disk 28. Preferably, housing 52 is structured such that as much of the fluid as possible is brought into contact with whipper disk 28. Similarly, whipper housing 52 is further structured such that the fluid remains in substantial contact with the whipper disk 28 long enough to form an acceptable number of bubbles therein. It is understood that when referring to the fluid coming into contact with whipper disk 28, that direct contact is not required, it is simply enough that the fluid be influenced by the shape and movement of whipper disk 28 to form the desired cavitations therein, resulting in bubbles.

Whipper disk 28 can be spaced from back wall 58. In the preferred embodiment, rear surface 49 of whipper disk 28 is spaced from back wall 58 at a distance that is minimized to prevent too large a quantity of fluid from passing into the space between whipper disk 28 and back wall 58, but is sufficient to prevent interference by, for example, friction between whipper disk 28 and back wall 58 during operation of whipper disk 28. Accordingly, whipper disk 28 is spaced apart from back wall 58 by at least about 0.25 mm and at most 2 mm. More preferably the spacing is at least about 0.5 mm, and most preferably at least about 1 mm.

The back wall 58 preferably has a larger outer diameter than the whipper disk 28, preferably at least about 10% larger. The outer diameter of the back wall 58 of the preferred embodiment is at least about 30 mm and at most about 60 mm.

A product exit tube 72 is disposed downstream of the whipper disk 28 and back wall 58 and is disposed to dispense the prepared fluid mixture. The product exit tube 72 is shown as an integral part of unitary construction with the input container 12. The product exit tube 72 preferably comprises a conduit with a diameter selected according to the final product that is to be dispensed. The preferred product exit tube 72 has an internal diameter of about between 2 mm and 5 mm for embodiments intended to prepare several different milk and coffee beverages. Embodiments intended primarily for coffee preferably have a product exit tube 72 with an internal diameter of about between 1 mm and 3 mm, and in embodiments intended primarily for milk, the internal diameter is preferably from about 4 mm to 8 mm. The diameter of the product exit tube 72 is selected to obtain the desired pumping performance from the whipper disk 28. Increasing the diameter of the conduit allows a faster flow, while decreasing the diameter provides more back-pressure to retain the fluid mixture in the whipper assembly and input chamber 12 for a longer time. A dispensing spout 75 is preferably attached at the end of the product exit tube 72 for easier dispensing into a cup. Thus, a beverage having a high-quality crema can be dispensing after whipping of the desired beverage mixture.

As shown in FIG. 2, dispensing spout 75 can be configured with a tapered portion 77 therein, which acts as a restrictor. Tapered portion is configured to restrict the flow of the fluid therethrough, which can reduce the velocity of the flow of the liquid product through output spout 72, which, in turn, prolongs the exposure of the fluid to the whipper disk 28. This can lead to increased efficiency in the production of crema-forming bubbles. Preferably, the smaller diameter of tapered portion 77 is at most about 95% of the size of the diameter of exit tube 72 and is more preferably between 80% and 90% of the size, and is most preferably about 88%. Furthermore, the effectiveness of tapered portion 77 can be increased by extending tapered portion 77 over a length of at least 2 cm, and more preferably at least about 5 cm. In a preferred embodiment, tapered portion has a length of between 4 cm and 8 cm, and more preferably about 6 cm although other lengths are possible. Preferably tapered portion is configured to restrict the flow of the fluid therethrough compared to prior whipping devices. In an embodiment, tapered portion 77 can be configured to taper further over the length thereof. For example, tapered portion 77 diameter can continuously decrease until near the downstream end of the dispensing spout 75 reaching a most tapered diameter that is at most about 90% of the diameter of exit tube 72. In one embodiment the downstream end of tapered portion 77 has a diameter that is between about 60% and 80% of the diameter of exit tube 72, and more preferably between about 65% and 75%. In a preferred embodiment the diameter of the downstream end of tapered portion 77 is about 68% of the diameter of exit tube 72. An additional or alternative restrictor can be included within dispensing spout 75 such as a disk having an aperture formed therein that has a diameter that is smaller than that of exit tube 72.

In an embodiment, dispensing spout 75 can include a secondary inlet 86 for accepting a secondary fluid supply. Preferably, the secondary fluid supply originates from a common source as the fluid that enters mixing chamber 12 through inlet 16, which preferably includes a heater to heat the fluid, which can be water, to a preferred temperature. The presence of inlet 86 can be useful when a large volume of a beverage, particularly coffee, is to be prepared and dispensed in a short amount of time. A preferred embodiment of device 10 can be shaped such that the prepared fluid flows too slowly through whipper housing 52 and exit tube 72 to produce a large volume thereof in a short amount of time. Accordingly, the beverage can be prepared at a higher concentration than is preferred for drinking by providing less fluid, preferably water, through inlet 16, than would normally be used. This requires a lower volume of fluid to pass through housing 52. Fluid, preferably water, is then provided through secondary inlet, which passes through the outlet end thereof and into the container. Preferably, the fluid flow through secondary inlet 86 into dispensing spout 75 is at least partially influenced by gravity. Fluid flow through secondary inlet 86 can be done concurrently with the output of the concentrated fluid from whipper housing 52. The amount of fluid provided through secondary inlet 86 is preferably suitable to provide the desired consumption concentration for the beverage. Preferably, the device is configured to allow a user thereof to select this option. Further, secondary inlet 86 can be used to provide an unprepared fluid, such as water, from the output end of exit tube 72. In a further preferred embodiment, the speed of whipper disk 28 can be reduced during such beverage preparation and can further be completely stopped. The downstream end of dispensing spout 75 is preferably structured such that a cup or other beverage conveyance can be placed therebeneath to receive the prepared beverage when dispensed from device 10. Further preferably, the downstream end of dispensing spout 75 is wider than the tapered portion 77 and is further preferably wider than exit tube 72.

Output plate 80 is preferably affixed on the end of dispensing spout 75. Output plate 80 is preferably structured to control the rate of fluid flow therethrough such that the fluid provided through secondary inlet properly mixes with the beverage mixture that is provided by exit tube 72. Output plate can also further reduce or eliminate the large, undesirable bubbles when a large volume of fluid product is dispensed. The orifices 82 in output plate 80 are sized to be large enough to allow small crema bubbles to pass therethrough undisturbed, but to either break up larger bubbles or to remove them from the dispensed product. The output plate 80 can also contribute to velocity reduction and then the reduction of large bubbles, in particular by the means of its thickness 84. Preferably holes 82 are between about 1 and 1.5 mm in diameter and are more preferably about 1.25 mm. The thickness 84 of plate 80 is preferably between about 1 and 1.5 mm and is more preferably about 1.25 mm. In a preferred embodiment the diameter of openings 82 is preferably about equal to the thickness 84 of plate.

A coil spring 88 can be fitted within dispensing spout 75. Coil spring 88 is configured to disrupt the flow of fluid through dispensing spout 75 such that large bubbles are trapped therein and separated from the fluid or are, alternatively, broken up into smaller bubbles. In an embodiment, coil spring 88 can extend past the intersection of secondary inlet 86 and tapered portion 77. Coil spring is preferably formed from stainless steel wire, although other suitable materials can be used. The overall diameter of coil spring 88 can be structured so that coil spring 88 fits within exit tube 72 snugly but without causing compression thereof. Alternatively, coil spring 88 can fit loosely within exit tube 72. Alternative filter structures can be used in place of coil sprint 88.

Figure 6:
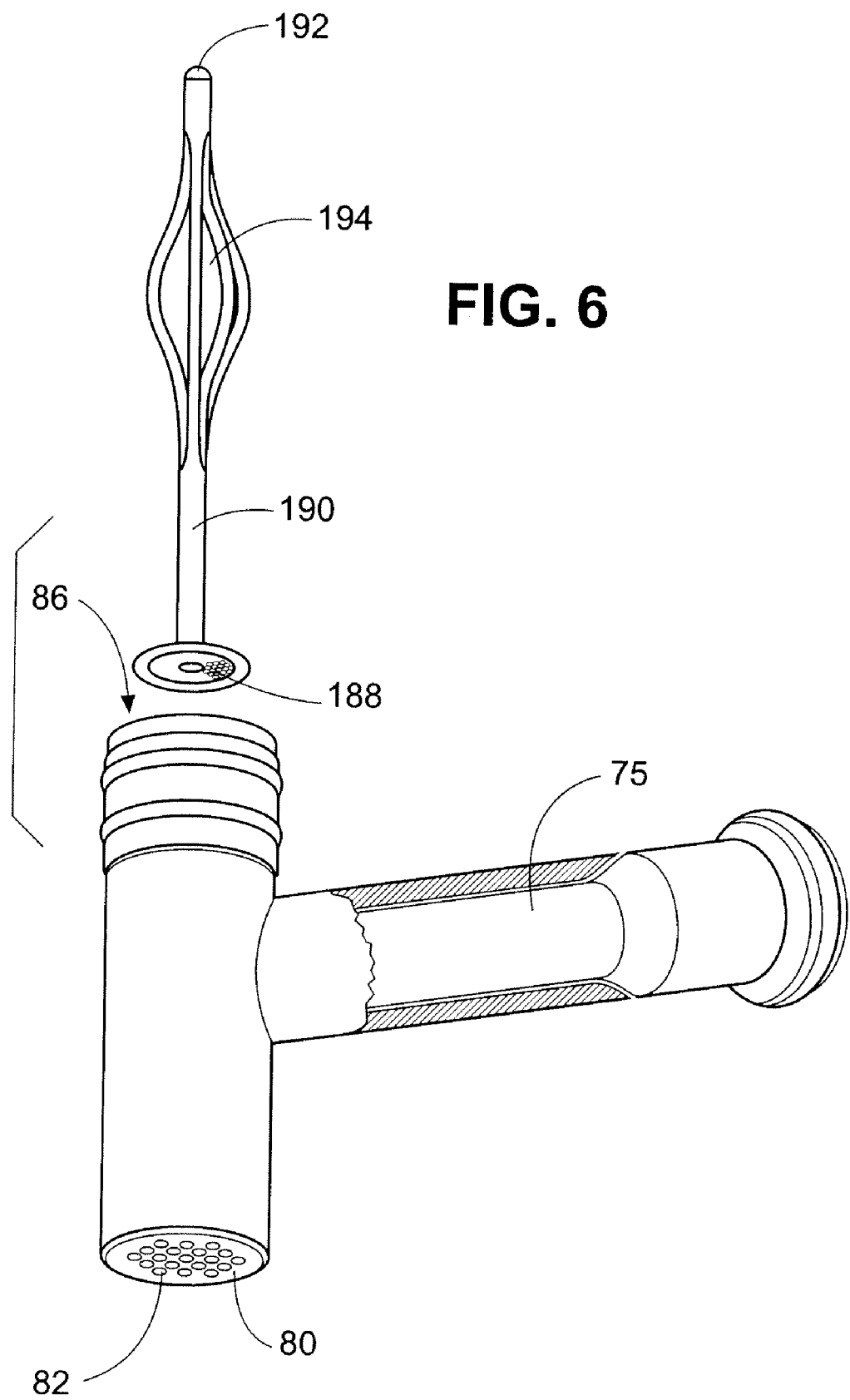
FIGS. 6-8 show an alternative embodiment of a dispensing spout configured for use with the whipping mechanism of FIGS. 1-5, the dispensing spout including a removable sieve.
Figure 7:
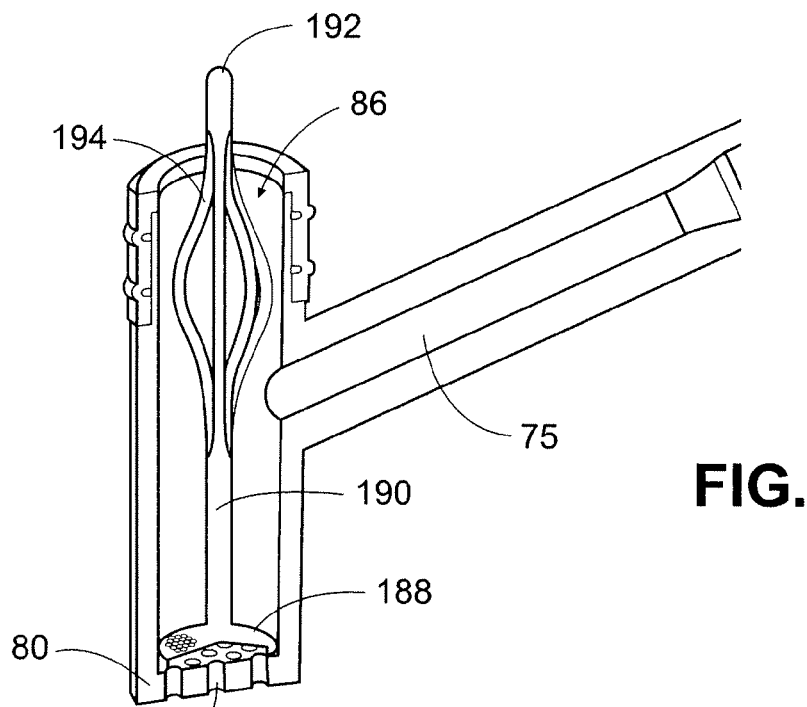
Figure 8:
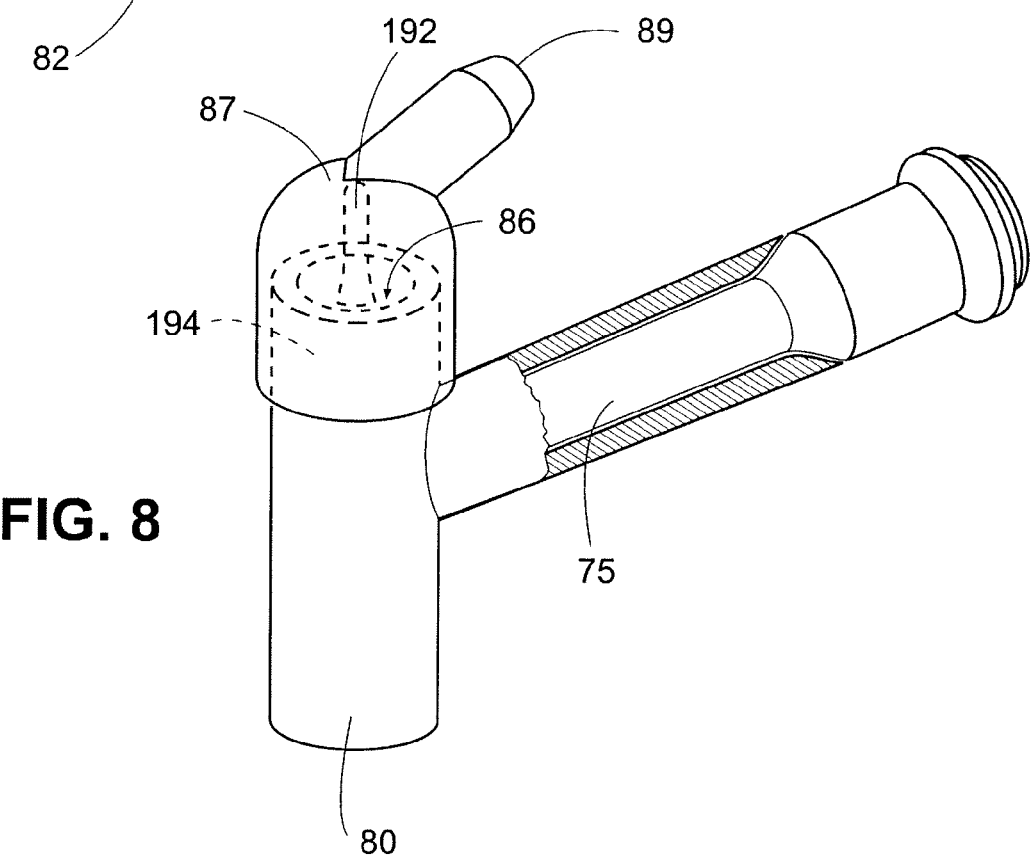
Figure 15:
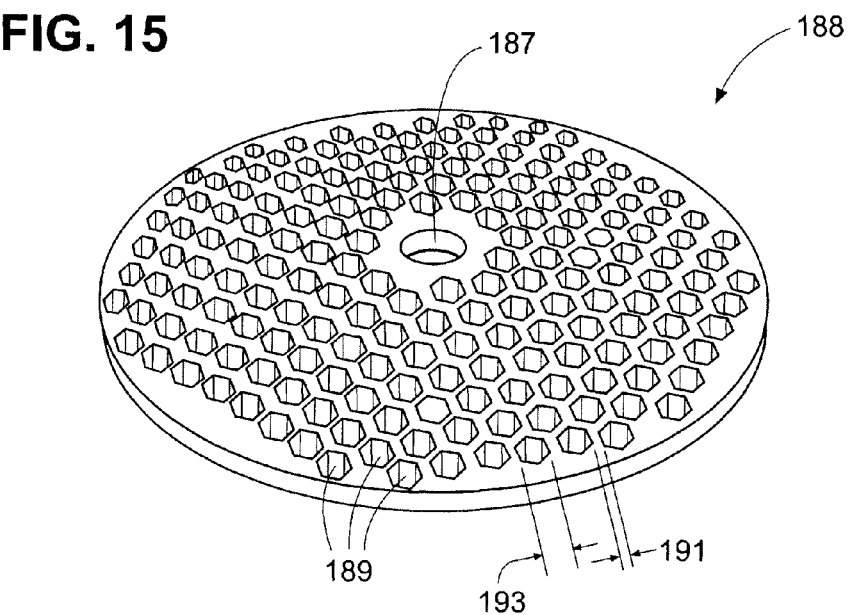
FIGS. 15 and 16 show an example of a sieve that can be used in the dispensing spouts of FIGS. 6-14.
Figure 16:
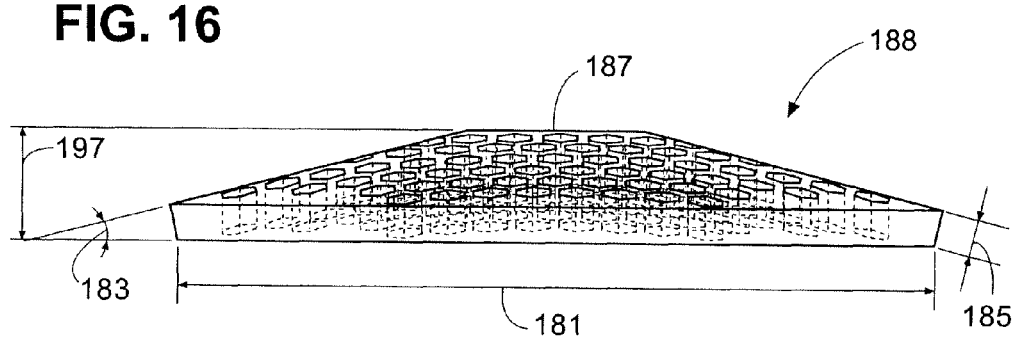

In an alternative embodiment, shown in FIGS. 6-8, sieve 188 can be positioned within dispensing spout 75 in a position near the interior surface of output plate 80. Sieve 188 is configured to disrupt the flow of fluid through dispensing spout 75 such that large bubbles are trapped therein and separated from the fluid or are, alternatively, broken up into smaller bubbles. An example of an acceptable sieve 188 is shown in FIGS. 15 and 16, and is formed from a piece of stainless steel sheet metal, although other materials, such as wire mesh or molded plastic, are used in alternative embodiments. Sieve has an outer diameter 181 that is sized so that sieve can fit securely within dispensing spout 75 at the desired location. In the embodiment of FIGS. 6-8, outer diameter 181 is further such that sieve 188 can slide within dispensing spout 75. In an embodiment, outer diameter 181 is between about 8 mm and 15 mm, and more preferably between about 10 mm and 12 mm. In a preferred embodiment outer diameter 181 is about 11 mm. Generally, the diameter size is dependent on the size of the dispensing spout. Sieve 188 includes a plurality of holes 189 formed therein. Holes 189 are formed so as to trap or break up large bubbles as the liquid passes therethrough. In an embodiment holes 189 have a width 193 between about 0.2 mm and 1 mm, and more preferably between about 0.4 mm and 0.6 mm. In a preferred embodiment, holes 189 have a width of about 0.5 mm. The optimum size of the holes is between 440 to 500 microns, holes smaller than this size retain more crema in the nozzle and also adversely impact the flow-rates of the coffee. For holes with size above 500 microns the crema has generally larger bubbles. The number of holes 189 formed in sieve 188 can depend on the outer diameter 181 thereof, as well as the width 193 of holes 189. Generally, sieve 188 can have as many holes 189 as will fit within outer diameter 181 thereof with an acceptable distance 191 therebetween. In an embodiment, distance 191 is between about 0.1 mm and 0.3 mm and more preferably about 0.2 mm. The holes in the preferred embodiment are hexagonal, but other shapes such as round or rectangular can alternatively be used. In a further preferred embodiment, the openings have an area of between about 0.02 $mm^2$ and 0.04 $mm^2$ and more preferably about 0.03 $mm^2$.

Sieve 188 has a material thickness 185 of between 0.1 mm and 1 mm, and more preferably between about 0.3 mm and 0.7 mm. In a further embodiment, thickness 185 is at least about 0.4 mm and alternatively less than about 0.6 mm. In a preferred embodiment, thickness 185 is about 0.5 mm. In an embodiment, thickness 185 is approximately equal to width 193 of openings 189. In an alternative embodiment, such as one in which sieve 188 is formed from wire mesh, thickness 185 can be approximately equal to distance 191 between adjacent openings 189.

Sieve 188 is preferably formed to have a substantially dome shape or conical shape preferably with a concave part facing the outlet, although it can alternatively be reversed. It has been observed that a convex sieve produces better crema than a flat sieve. In a preferred embodiment, the conical shape is such that the inner portion thereof has a height 197 of between about 1 mm and 2 mm. In an embodiment, height 197 is at least about 1.2 mm, and more preferably about 1.6 mm. In a further embodiment, height 197 is related to outer diameter 181 such that height 197 is between about 10% and 20% of outside diameter 181, and more preferably between 12% and 16%. In a preferred embodiment, height 197 is about 14% of the outside diameter 181. Alternatively, the substantially conical shape of sieve 188 can form angle 183, wherein angle 183 is between about 10° and 20°. In an embodiment angle 183 is at least about 14°, and alternatively less than about 18°. In a preferred embodiment, angle 183 is about 16°.

Sieve 188 can include a hole 187 formed near the center thereof to which an extension 190 can be affixed, as shown in FIGS. 6, 7 and 8. In the embodiment of FIGS. 7 and 8, extension 190 is sized such that the proximal end 192 thereof is accessible to a user from secondary inlet 86. In such an embodiment, as discussed above, sieve 188 is slideably disposed within dispensing spout 75, and extension 190 permits a user to remove sieve 188 from dispensing spout so as to clean any deposits or residue from the void formed between the bottom surface of sieve 188 and the upper surface of output plate 80. Extension 190 can further be formed with a plurality of supports such as wings 194 that are sized to abut the inside surface of dispensing spout 75, preferably upstream of sieve 188 so as to help maintain a proper position for sieve 188 during liquid dispensing. Further, secondary inlet 86 can include a cap 87 with an inlet extension 89, wherein cap 87 abuts proximal end 192 of extension 190 to further maintain a desired position for sieve 188, while inlet extension 89 permits the desired operation of secondary inlet 86, as discussed above.

Figure 9:
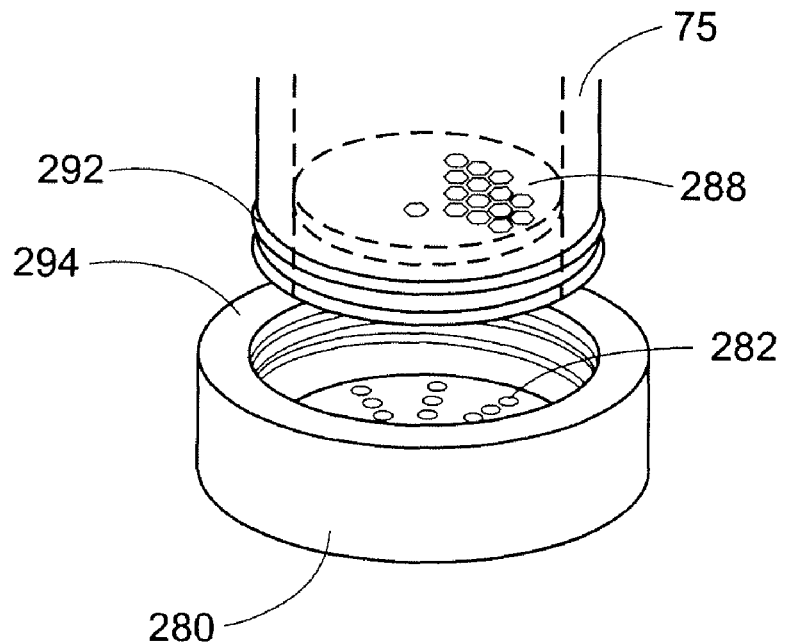
FIGS. 9-14 show further alternative embodiments of dispensing spouts configured for use with the whipping mechanism of FIGS. 1-5, the dispensing spouts having various forms of a removable output plate.
Figure 10:
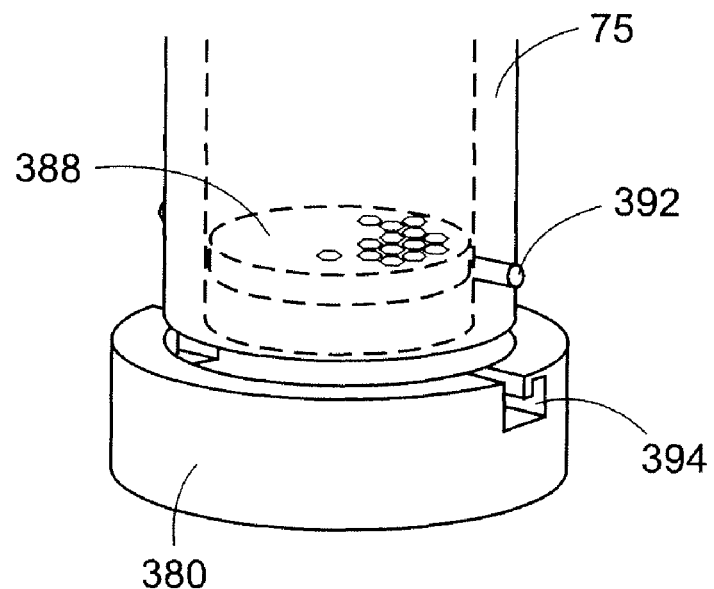

Alternatively, the output plate can be removably affixed to the downstream end of dispensing spout 75 to permit access to the void between the sieve and the output plate to permit cleaning and the like. As shown in FIG. 9, output plate 280 is removably affixable to dispensing spout 75 using mating threads 292, 294. In this and similar embodiments, sieve 288 can be affixed within dispensing spout 75, by a press-fit or using adhesives, or can be removable. In this and other similar embodiments, sieve 288 can be similar to that which is shown in FIGS. 15 and 16, but without a large hole 187 formed thereon, a number of holes 189 preferably being formed in its place. An arrangement in which sieve 288 is removable is beneficial because it permits more thorough cleaning or complete replacement of sieve 288, if desired; however, a removable sieve 288 is more easily lost during cleaning because of the small size (it is noted that the presence of extension 190 in the embodiment of FIGS. 6, 7 and 8 makes sieve 188 less susceptible to loss). In an alternative embodiment, shown in FIG. 10, output plate 380 can include a bayonet-type fit with dispensing spout 75 in which post 392 fits within track 394 to require output plate 380 to be pressed upward before turning to release output plate 380 from dispensing spout 75.

Figure 11:
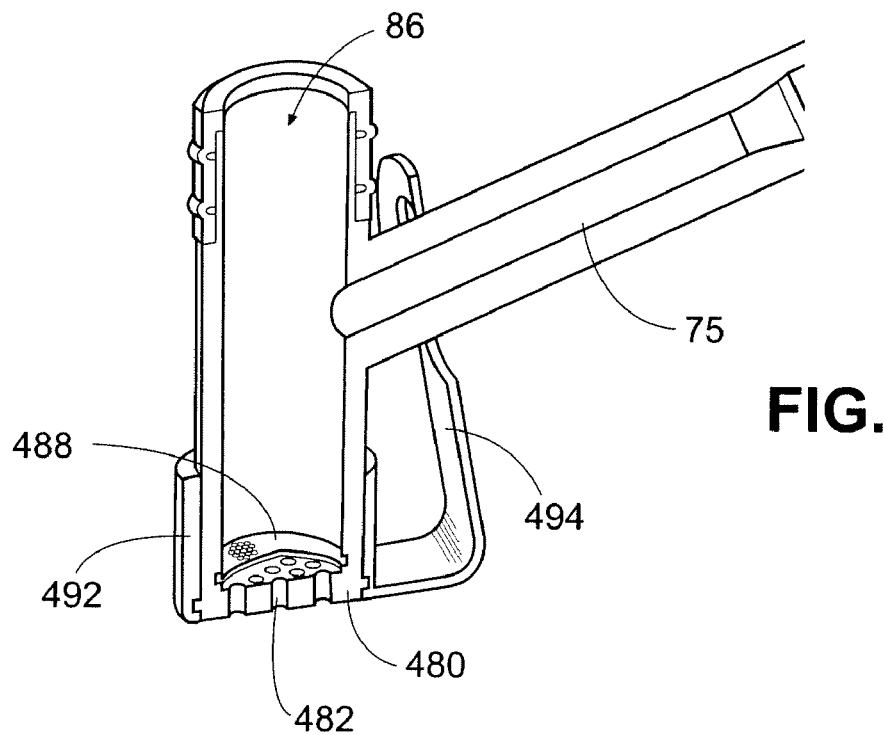
Figure 12:
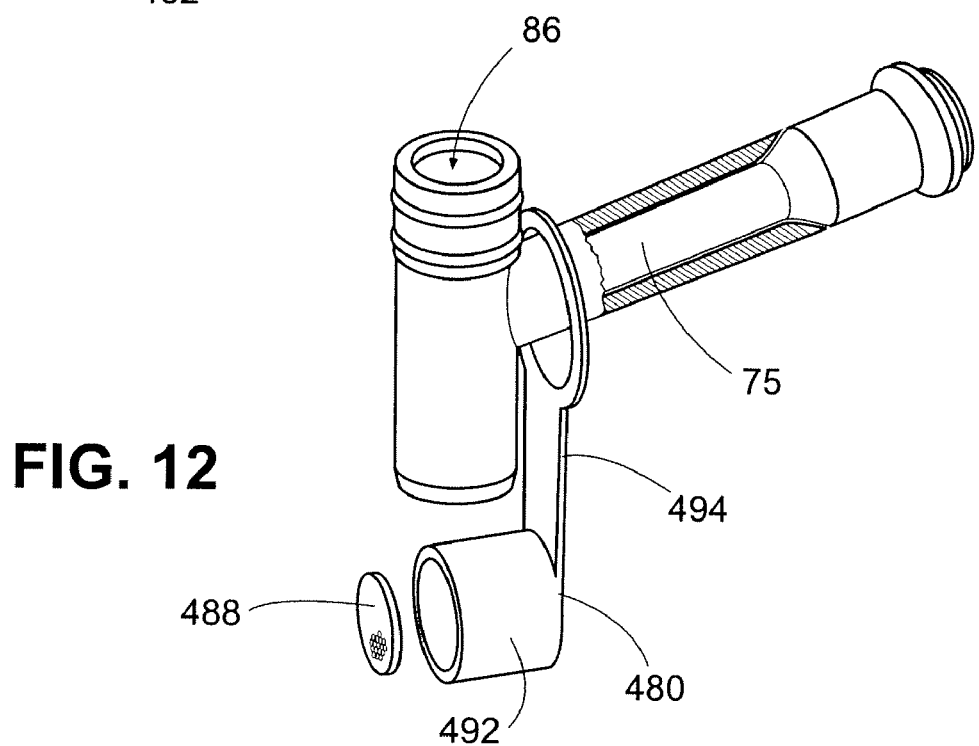

An alternative embodiment of a removable output plate 480 is shown in FIGS. 11 and 12, in which output plate 480 includes a sleeve 492 extending upwardly from the outer edge thereof to facilitate a removable press-fit of output plate 480 onto the downstream end of dispensing spout 75. This arrangement, and other arrangements with a removable output plate, can include a retaining band 494 that connects output plate 480 to a portion of dispensing spout 75 such that output plate 480 is suspended from dispensing spout 75 when it is removed for cleaning or the like. In such an embodiment, output plate 480 can be formed from metal, hard plastic or the like, and sleeve 492 can be formed separately and assembled with output plate. In such an embodiment, sleeve and retaining band can be integrally formed together from a soft plastic. In other embodiments, the output plate can be integrally formed with the sleeve and the retaining band.

Figure 13:
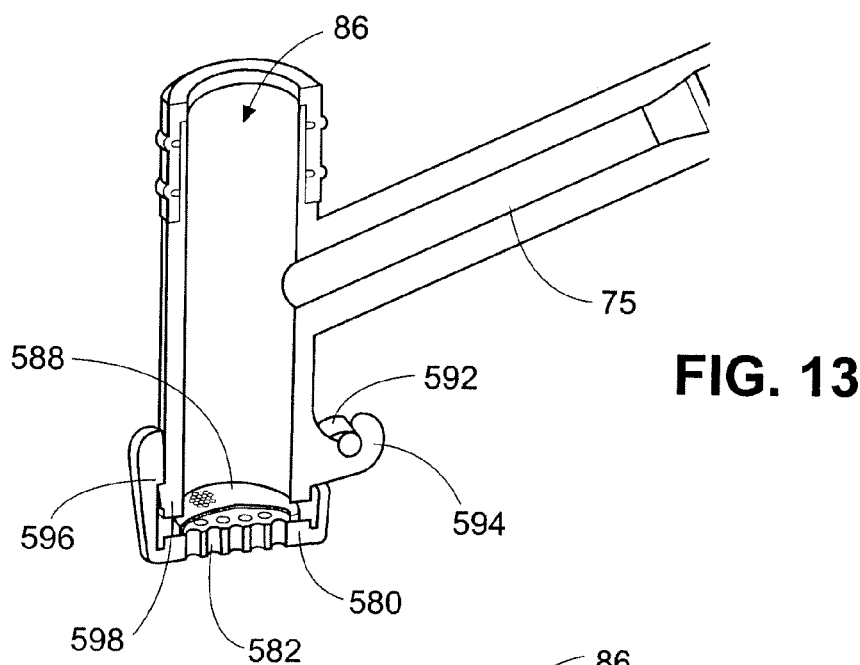
Figure 14:
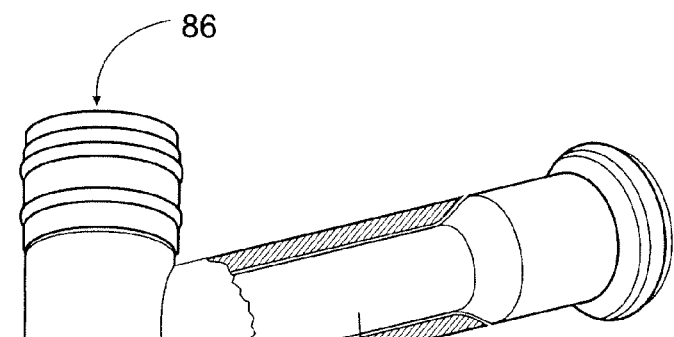
Figure 14:
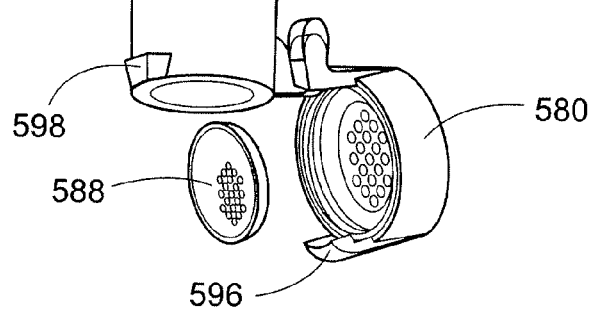

A further embodiment of a removable output plate 580 is shown in FIGS. 13 and 14. In this embodiment, output plate 580 includes a first hinge portion 592 that mates with a second hinge portion 594 included on the downstream end of dispensing spout 75 to allow output plate 580 to rotate relative to dispensing spout 75 to allow access to the void between sieve 588 and output plate 580 to allow cleaning and the like. A clip 596 is included on output plate 580 substantially opposite from first hinge portion 592. Clip fits over projection 598 to secure output plate over the downstream end of dispensing spout 75, and is resiliently deformable to permit removal therefrom. In a similar, alternative embodiment, the hinge portion can be configured such that the output plate can be rotated sideways away from the downstream end of the dispensing spout to allow access to the sieve for cleaning. The output plate can further include a shape such that a portion thereof fits within the dispensing spout to help secure the output plate over the downstream end thereof, when desired. A spring can also be included to bias the output plate in the appropriate position.

A variation of the embodiments shown in FIGS. 6-13 can include two sieves, one sieve replacing the output plate. Alternatively an embodiment can include two output plates, one output plate replacing the sieve. Additionally, the various arrangements for dispensing spout having an output plate and sieve shown in FIGS. 6-14 can be used in connection with various whipper configurations.

A seal, such as o-ring 90, seals the space between the whipper housing 52 of the input container 12 and product exit tube 72 area, and the back wall member 58.

In use, the fluid is tangentially introduced into the input container 12 through tangential inlet 16. In the preferred embodiment, the fluid comprises water, and the flow rate is about between 3 mL/sec and 30 mL/sec, more preferably about between 5 mL/sec and 15 mL/sec, and most preferably about between 9 mL/sec and 12 mL/sec. At the time or preferably after the water flow into the input container 12 is commenced, a powdered food component, such as a powdered coffee product and/or powdered milk, is dosed into the water through powder inlet 18. Alternatively, a fluid concentrate can be used in addition to or instead of a powder. Preferably the powder dosing begins at least about 0.1 sec after the water dosing begins and more preferably at least about 0.3 sec. later, and preferably at most about 3 sec later, and more preferably at most about 1.0 sec later. Preferably the water is continued to be fed into the input container 12 until the powder dosing is stopped, and preferably at most about 8 sec after the powder dosing ends, and more preferably at most about 3 sec later, and preferably at least about 1.0 sec later. When a liquid concentrate is used in place of the powder, the same process steps are implemented.

The water and powder start getting mixed in the swirling flow within the input container 12, including the throat portion 22. The whipper disk 28 is rotated by the motor 30 at a speed sufficient for pumping the mixture towards the product exit tube 72 and for producing the desired foaming and aeration effect. The whipper disk 28 sucks in air for incorporation into the mixture. The speed of the whipper disk 28 is preferably variable to enable a speed selection to deliver the desired amount of energy to the mixture to produce the desired frothing. For obtaining products of certain qualities, the rotation speed of the whipper disk 28 can be varied between two or more speeds during the preparation of a single product. Device 10 is preferably structured to provide a layer of froth, that is similar in thickness and bubble size to that of crema, especially on beverages like coffee or espresso. Device 10, for example, can provide a high specific energy dissipation to generate a milk froth and a moderately low specific energy dissipation to obtain a high-quality coffee crema in the same unit. The frothed product is then dispensed through the product exit tube 72.

The energy dissipation of the device can be controlled by adjusting the disk speed, and product flow rate, although these quantities are interdependent. An increase in disk speed and a decrease in flow rate will provide a higher energy dissipation. The preferred flow rate is between at least about 5 g/sec and up to about 30 g/sec, and more preferably at least about 8 g/sec and up to about 15 g/sec. The flow-rate of the system can be controlled using one or more of the previously-discussed restrictor devices. In a preferred embodiment, the flow rate is optimized for the desired high quality crema formation and is at most about 10 g/sec, and is preferably less than about 8 g/s. Also, if rpm is increased, noise and cost of the machine will increase as well.

The preferred embodiments described above allow a device of compact size, and with a desirable flow rate for preparing individual drinks to be provided without requiring extremely high disk speeds, such as of above about 30,000 rpm. Preferably, the disk speed is at least about 5,000 rpm and at most about 25,000 rpm, more preferably is at least about 10,000 rpm and at most about 15,000 rpm, although other speeds can be used. At these rotation speeds, a whipper disk can have a transverse diameter 38 of about 18 mm or greater. Raising and lowering the disk speed can produce different characteristics for the beverage. Further, the combination of a frothed beverage produced using the whipper according to different speeds and the addition or not of a non-frothed liquid from secondary inlet 86 can further vary the beverage characteristics.

While illustrative embodiments of the invention are disclosed herein, it will be appreciated that numerous modifications and other embodiments may be devised by those skilled in the art. For example, the whipper disk may have an inward facing whipper surface and rotate with respect to a portion of the whipper housing that extends inside the whipper. Therefore, it will be understood that the appended claims are intended to cover all such modifications and embodiments that come within the spirit and scope of the present invention.

All of the references specifically identified in the detailed description section of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A beverage dispenser, comprising:
   a whipper configured for flowing a liquid beverage mixture therethrough and for whipping a beverage mixture to produce a crema;
   a dispensing spout connected downstream of the whipper for dispensing the whipped beverage mixture;
   a first filter element disposed within the dispensing spout configured for preparing small bubbles by reducing the number of large bubbles present within the fluid that are greater than a predetermined size; and
   a second filter element covering a downstream end of the dispensing spout and having a plurality of holes formed therein for reducing the velocity of the whipped beverage mixture through the dispensing spout;
   wherein the holes of the second filter element are larger than the size of the small bubbles generated by the first element so that a crema of the small bubbles is dispensed.

2. A beverage dispenser, comprising:
   a whipper configured for flowing a liquid beverage mixture therethrough and for whipping a beverage mixture to produce a crema;
   a dispensing spout connected downstream of the whipper for dispensing the whipped beverage mixture;
   a first filter element disposed within the dispensing spout configured for preparing small bubbles by reducing the number of large bubbles present within the fluid that are greater than a predetermined size; and
   a second filter element covering a downstream end of the dispensing spout and having a plurality of holes formed therein for reducing the velocity of the whipped beverage mixture through the dispensing spout, wherein the first filter element is a sieve having a first plurality of holes formed therein, and wherein the second filter element is an output plate having a second plurality of holes formed therein, the first plurality of holes being smaller in size than the second plurality of holes.

3. The dispenser of claim 2, wherein the output plate and the sieve are spaced to form a void between the bottom surface of the sieve and the upper surface of the output plate, and wherein the dispensing spout is configured to permit access to the space therebetween to a user.

4. The dispenser of claim 3, wherein the output plate is moveable away from the downstream end of the dispensing spout to permit access to the void between the output plate and the sieve.

5. The dispenser of claim 4, wherein the sieve is affixed within the dispensing spout.

6. The dispenser of claim 3, wherein the output plate is affixed to the dispensing spout by a hinge that permits the output plate to be selectively positioned to cover the downstream end of the dispensing spout and such that the output plate is moveable away from the downstream end of the dispensing spout.

7. The dispenser of claim 6, wherein the output plate includes a clip configured to maintain the output plate in a position so as to cover the downstream end of the dispensing spout.

8. The dispenser of claim 3, wherein the output plate is removably affixed to the dispensing spout.

9. The dispenser of claim 8, wherein the output plate is removably affixed to the dispensing spout in a press-fit association.

10. The dispenser of claim 3, further comprising a secondary inlet in fluid communication with the dispensing spout such that the liquid beverage mixture from the whipper will not flow through the secondary inlet during normal operating conditions, and wherein the sieve is removable from the dispensing spout through the secondary inlet.

11. The dispenser of claim 10, wherein the sieve has an extension affixed thereto having a proximal end that is positioned proximate to the secondary inlet and configured to permit a user to grasp the proximal end to aid in removing the sieve from the dispensing spout.

12. The dispenser of claim 11, wherein the extension includes a number of radially-extending wings to maintain a desired position of the sieve within the dispensing spout.

13. The dispenser of claim 12, further including a cap removably affixable to the secondary inlet and configured to abut the proximal end of the extension to maintain a desired position of the sieve within the dispensing spout.

14. The dispenser of claim 13, wherein an inlet extension associated with the cap additionally functions as a secondary inlet in fluid communication with the dispensing spout and configured for receiving a fluid from a fluid source that feeds both the mixing chamber and the secondary inlet.

15. The beverage dispenser of claim 2, wherein the output plate is removably affixed to the dispensing spout to permit the output plate to be selectively positioned to cover the downstream end of the dispensing spout but such that the output plate is moveable away from the downstream end of the dispensing spout to allow cleaning of the dispensing spout.

16. A method for preparing a beverage having a high-quality crema, which comprises introducing a beverage mixture into the whipper of the beverage dispenser of claim 14; whipping the beverage mixture; and dispensing a beverage having a crema from the dispenser.

17. A method for preparing a beverage having a high-quality crema, which comprises introducing a beverage mixture into the whipper of the beverage dispenser of claim 15; whipping the beverage mixture; and dispensing a beverage having a crema from the dispenser spout.

* * * * *